(12) United States Patent
Studer et al.

(10) Patent No.: US 11,214,074 B2
(45) Date of Patent: Jan. 4, 2022

(54) FROTH COALESCING DEVICE

(71) Applicant: Hewlett-Packard Development Company, L.P., Spring, TX (US)

(72) Inventors: Anthony D Studer, Corvallis, OR (US); Robert S Wickwire, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 169 days.

(21) Appl. No.: 16/500,514

(22) PCT Filed: Apr. 13, 2017

(86) PCT No.: PCT/US2017/027360
§ 371 (c)(1),
(2) Date: Oct. 3, 2019

(87) PCT Pub. No.: WO2018/190840
PCT Pub. Date: Oct. 18, 2018

(65) Prior Publication Data
US 2020/0055319 A1 Feb. 20, 2020

(51) Int. Cl.
*B41J 2/19* (2006.01)
*B01D 19/00* (2006.01)
*B01D 69/06* (2006.01)

(52) U.S. Cl.
CPC ............ *B41J 2/19* (2013.01); *B01D 19/0031* (2013.01); *B01D 69/06* (2013.01)

(58) Field of Classification Search
None
See application file for complete search history.

(56) References Cited

U.S. PATENT DOCUMENTS

| | | | |
|---|---|---|---|
| 6,244,697 B1 | 6/2001 | Powers et al. | |
| 6,739,706 B2 | 5/2004 | Baromaga et al. | |
| 7,118,206 B1 | 10/2006 | Stockwell et al. | |
| 7,429,101 B2 | 9/2008 | Petersen et al. | |
| 7,726,786 B2 | 6/2010 | Therien et al. | |
| 8,348,397 B2 | 1/2013 | Coffey et al. | |
| 2002/0121195 A1* | 9/2002 | Hirayama | B01D 19/0031 96/219 |
| 2006/0090645 A1* | 5/2006 | Kent | B01D 19/0031 95/46 |
| 2007/0006735 A1 | 1/2007 | Olsen | |
| 2007/0052782 A1* | 3/2007 | Lee | B41J 2/19 347/97 |

FOREIGN PATENT DOCUMENTS

EP 1219333 A1 7/2002

* cited by examiner

*Primary Examiner* — Jason M Greene
(74) *Attorney, Agent, or Firm* — HP Inc. Patent Department

(57) ABSTRACT

A froth coalescing device includes a froth receiving chamber with a vent, and a vertical membrane arranged between the vent and a gas out port of the froth coalescing device. The vent is arranged to vent gas in a direction that is different from a direction of travel of froth in the froth receiving chamber.

12 Claims, 3 Drawing Sheets

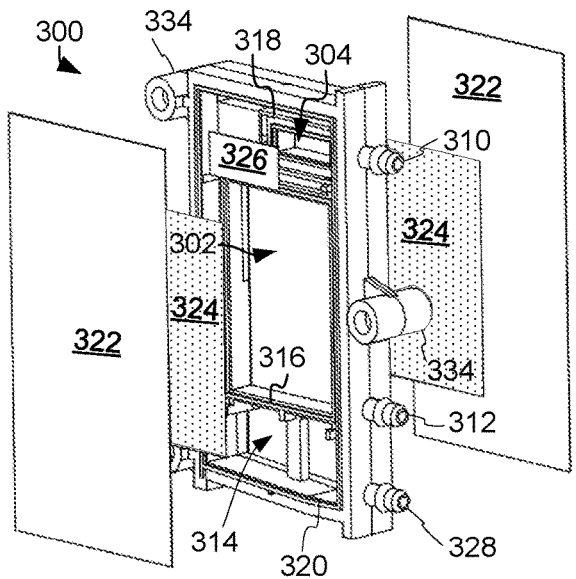
FIG. 3A
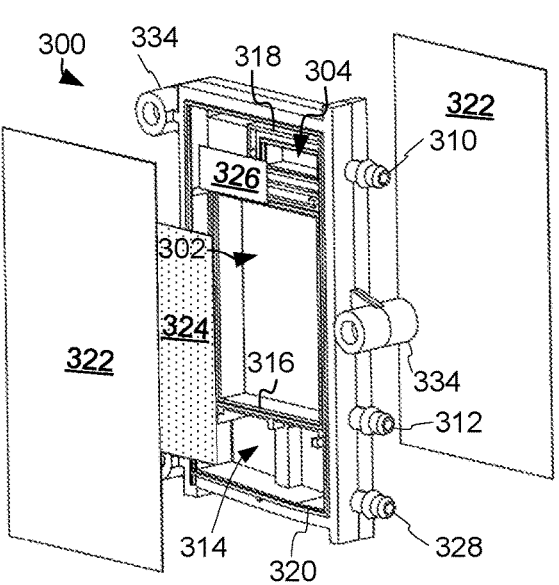
FIG. 3B
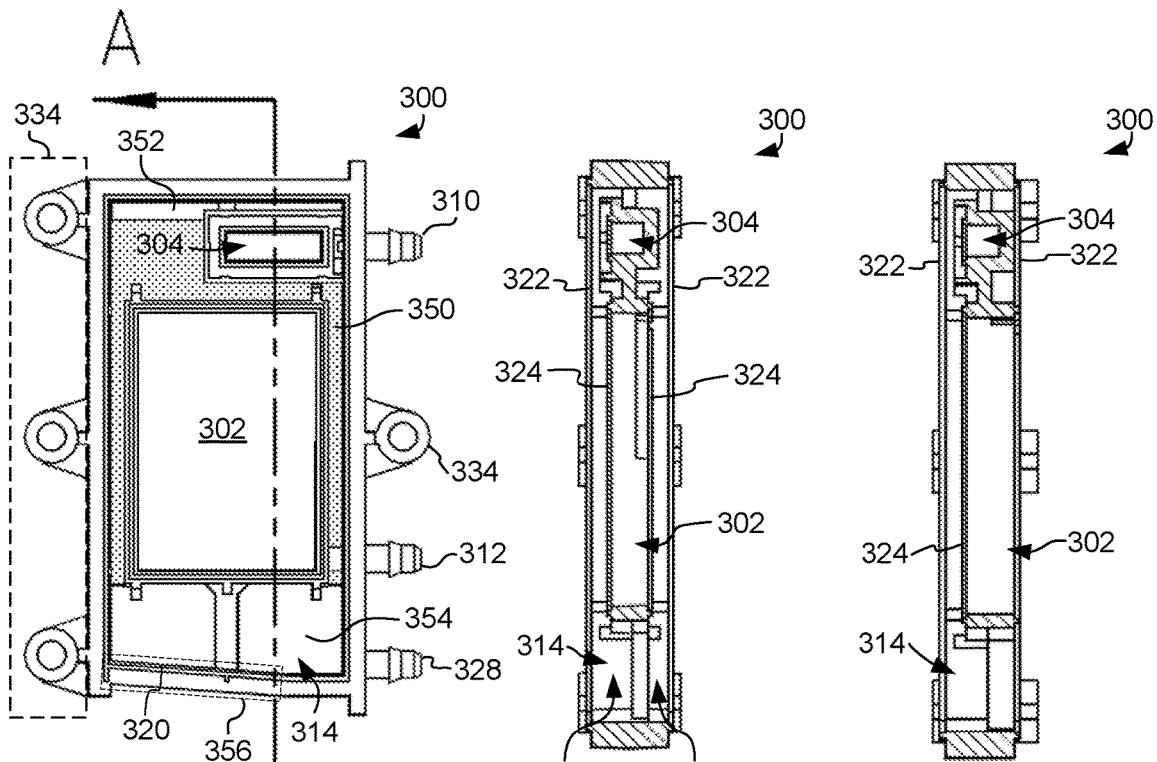
FIG. 3C
FIG. 3D
FIG. 3E

FROTH COALESCING DEVICE

BACKGROUND

Froth may form in fluid circulation systems. For instance, gasses may mix with liquids and may form gas bubbles.

BRIEF DESCRIPTION OF THE DRAWINGS

Various examples will be described below by referring to the following figures.

FIGS. 3A and 3B are exploded views of example froth coalescing devices;

FIG. 3C is a front view of an example froth coalescing device;

FIGS. 3D and 3E are cross-section views of the froth coalescing device of FIG. 3C according to different example implementations thereof.

Figure 1:
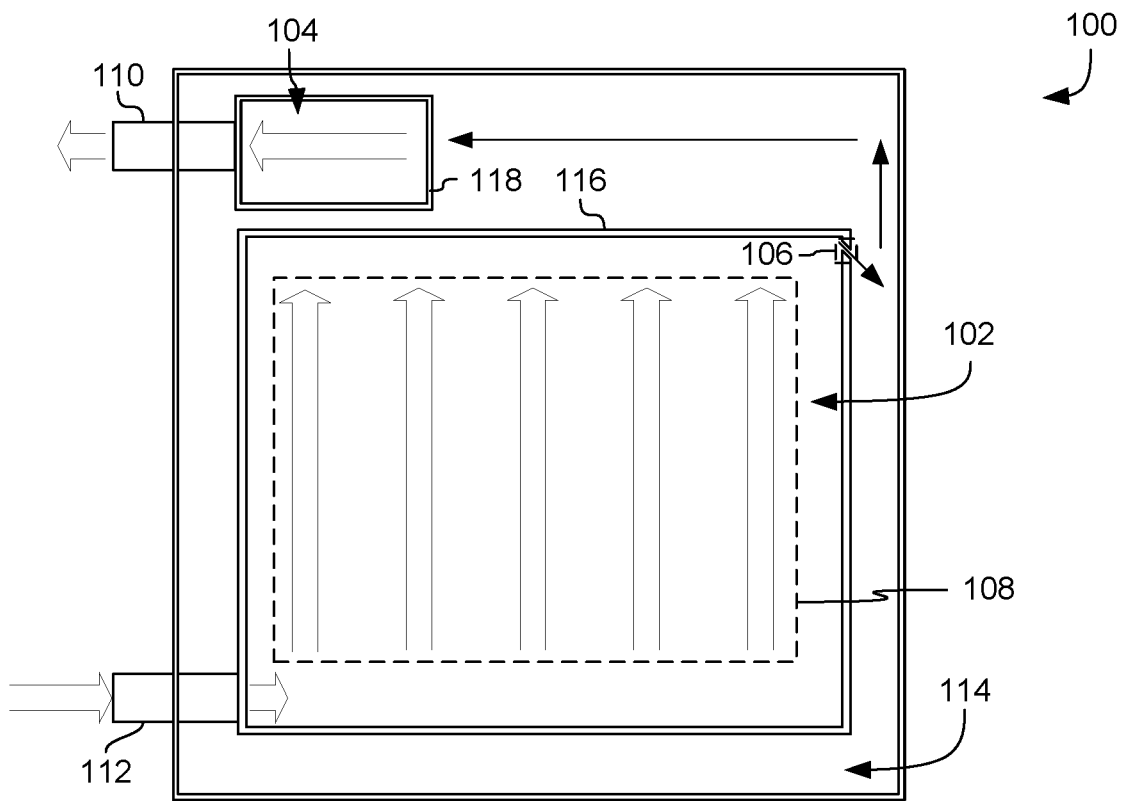
FIG. 1 is a schematic diagram of an example froth coalescing device.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration.

DETAILED DESCRIPTION

In some liquid circulation systems, gasses may be used to impel in part liquid circulation. For instance, pumps may be used to push air and liquids through the system. By way of example, in order to get printing fluid from a reservoir to a print head, some printers may use a pump to push air, and thus printing fluid, through the system. Subsequently, unused printing fluid may be returned to the reservoir. The use of a gas, such as air, to circulate liquids may cause a mixture of gas and liquid to form bubbles. The gas and liquid bubbles are referred to herein as froth.

Froth can be undesirable in some cases. For example, froth can cause erroneous sensor readings, such as for example erroneous fluid level readings. For instance, as froth builds in a reservoir with a fluid level detection mechanism, the froth may cause the fluid level detection mechanism to determine an erroneous fluid level value that does not accurately reflect the amount of liquid in the reservoir. Thus, it may be desirable to coalesce froth and recuperate liquids from the froth using a coalescing process.

Next, in at least some cases, processes of fabricating coalescing devices may include potentially complex or cumbersome operations of forming maze-like conduit structures, mounting screens and membranes in different orientations, etc. However, in some cases such complexity may be accepted as it may more effectively lead to coalesced liquid, for example. Nevertheless, there may be a desire for coalescing devices that do not include fabrication complexities while still allowing for effective liquid coalescing.

One method for limiting froth leakage (e.g., froth that leaves a coalescing chamber without coalescing) may comprise arranging a froth input port relative to a receiving chamber vent such that the froth input port is to discharge into a froth receiving chamber at an opposite portion of the froth receiving chamber from the receiving chamber vent. As such, froth that enters via the froth input port is to travel a distance within the chamber while changing direction at least once in order to leave the chamber through the vent. For instance, in one non-limiting example, the froth input port and the receiving chamber vent can be arranged on opposite corners of the chamber. Furthermore, the receiving chamber vent may be arranged in a direction different from the direction in which the froth is to travel. For instance, in one case, the vent may comprise a downward facing vent. Additionally, one or more filter screens may be arranged to form walls of the froth receiving chamber. The filter screens may have pores through which coalesced liquid can escape. And the surface of the filter screens may be abrasive, such that froth bubbles that contact the surface might break. Gasses that are released as the froth bubbles break may be capable of exiting the froth receiving chamber via the receiving chamber vent (and, potentially, the filter screen pores).

Next, one process that may be desirable, such as to reduce coalescing device fabrication complexity may comprise arranging filter screens, membranes, and device covers to attach to a coalescing device frame in a same or similar orientation. For example, in one case, it may be possible to attach one or more filter screens to one or more facing sides of a froth receiving chamber such that the attached filter screens are arranged vertically. Similarly, a membrane may be attached to a gas out chamber in a vertical orientation. And covers may also be arranged vertically, such as being attached to both sides of the coalescing device frame to define an external chamber arranged around the froth receiving chamber and the gas out chamber. Thus, like filter screens and membranes, the covers may also have a vertical orientation. In the following paragraphs an illustrative example device is discussed in conjunction with FIG. 1. It is noted that much of the present discussion refers to directions and orientations (e.g., horizontal, vertical, top, bottom, upper, lower, etc.). These terms are used to provide explanation of sample device elements with regard to other sample device elements, and sample method elements as to other method elements. As such, directional language is not intended to restrict the scope of claimed subject matter unless explicitly stated otherwise.

Figure 2:
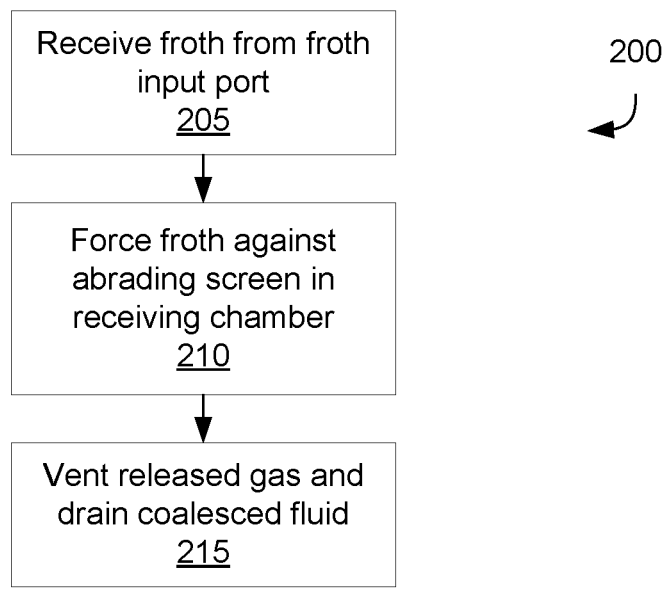
FIG. 2 is a flow chart of an example method for froth coalescing.

FIG. 1 shows a front view cross section of a coalescing device 100 having a froth input port 112 in fluid communication with froth receiving chamber 102. Coalescing device 100 also has a gas out port 110 in fluid communication with a gas out chamber 104. Block arrows illustrate a direction of travel for froth entering coalescing device 100 via froth input port 112. A group of block arrows 108 illustrate an approximate direction of travel for froth bubbles in froth receiving chamber 102. In one case, and as illustrated in block 205 of example method 200 of FIG. 2, froth may be received into froth receiving chamber 102 via froth input port 112. As should be apparent, froth bubbles entering froth receiving chamber 102 may push other froth bubbles towards a top portion of froth receiving chamber 102, such as illustrated at block 210 of example method 200 in FIG. 2. In one case, a vertically oriented filter screen (not shown) may be attached to a frame 116 around froth receiving chamber 102 such that froth bubbles moving in the direction indicated by arrows 108 may rub against the vertically-oriented filter screen. The combination of gravity and abrasive rubbing against filter screen surfaces may cause froth bubbles to burst, thus releasing gas to travel out of froth receiving chamber 102 towards gas out chamber 104 via a downward facing vent 106. Downward facing vent 106 may comprise an opening in a frame 116 of froth receiving chamber 102 that is angled downward, such as in a direction different from the direction of froth travel shown by arrows 108. In one example case, the downward angle of downward facing vent 106 may be substantially opposite to the direction of froth travel shown by arrows 108. In addition to the gas released and vented through downward facing vent 106, the bursting of froth bubbles may also release coalesced liquid to be drained out of froth receiving chamber 102, such as through pores of the filter screen. Block 215 of example method 200 of FIG. 2 illustrates one implementation of releasing gas through a vent in froth receiving chamber 102 and draining coalesced liquids.

Though not illustrated in FIG. 1, coalesced liquids may travel from froth receiving chamber 102, through pores of the drain screen, into an external chamber 114 and out a liquid out port (not shown). The liquid out port may, in some cases, be in fluid communication with a liquid reservoir, such as for storing printing fluids.

As mentioned above, gas released from the froth may travel out a vent in froth receiving chamber 102 (e.g., downward facing vent 106), as indicated by the arrows illustrated from downward facing vent 106 into external chamber 114 and on to gas out chamber 104. Thus, froth receiving chamber 102 may be in fluid communication with external chamber 114 via downward facing vent 106. It may be that an arrangement of coalescing device elements may cause released gas to change directions and cause further coalescing of any froth that may leak from froth receiving chamber 102. Gas out chamber 104 may be in fluid communication with a gas out port 110. A semipermeable membrane (not shown) may be attached to a frame 118 of gas out chamber 104. In one case, a semipermeable membrane attached to gas out chamber 104 may have a similar vertical orientation to a filter screen attached to froth receiving chamber 102. Gas may be capable of traversing the semipermeable membrane, while froth may be kept from entering gas out chamber 104, such as by the semipermeable nature of the membrane. For instance, the semipermeable membrane may allow released gas to enter gas out chamber 104 while blocking liquid traversal (e.g., froth).

FIGS. 3A and 3B provide exploded views of two implementations of froth coalescing device 300. In FIG. 3A, example coalescing device 300 comprises two facing filter screens 324. In FIG. 3B, example coalescing device 300 comprises a single filter screen 324. Single and two-sided filter screen coalescing device implementations may operate in a similar manner with a few minor differences, which are noted in the following description. It may be that single-sided implementations might be favored in some circumstances and two-sided implementations in others. For instance, in cases in which cost may be a concern and froth creation and flow rate is lower, a single-sided implementation may be favored. In another case in which there may be a desire to increase a rate of coalescing, a two-sided implementation may be favored. Similar to example coalescing device 100 in FIG. 1, froth coalescing device 300 may comprise a number of chambers, such as to facilitate liquid coalescing from a received froth. In one example, as illustrated in both FIGS. 3A and 3B, a froth receiving chamber frame 316, a gas out chamber frame 318, and an external chamber frame 320 may comprise an integrated frame of coalescing device 300. By way of example, froth receiving chamber frame 316, gas out chamber frame 318, and external chamber frame 320 may be attached and may form a unitary frame. The frame may comprise a number of possible materials (e.g., metals, alloys, plastics, etc.). In one case, molded plastic may be used, such as to reduce cost and weight, by way of example.

In one example, froth receiving chamber 302 may be arranged with respect to an external chamber 314 and a gas out chamber 304 such that coalesced liquids may travel, such as due to gravity, towards a lower portion of external chamber 314, and released gas may travel towards gas out chamber 304. Taking coalescing device 300 of FIG. 3A (e.g., a two-sided implementation) as a non-limiting illustrative example, froth receiving chamber 302 may be arranged centrally within coalescing device 300. An external chamber 314 may be arranged to substantially enclose froth receiving chamber 302 such that coalesced liquids may collect in a lower portion (e.g., lower portion 354 in FIG. 3C) of external chamber 314 and released gas may travel through an upper portion of external chamber 314 towards gas out chamber 304.

The arrangement of different chambers of coalescing device 300 may be understood by referring to FIGS. 3C-3E. FIG. 3C, for example, comprises a view A-A from which cross sections are illustrated in FIGS. 3D and 3E. FIG. 3D is a cross-section for an example coalescing device 300 having two filter screens 324 (e.g., a two-sided coalescing device), similar to coalescing device 300 of FIG. 3A. FIG. 3E is a cross-section for an example coalescing device 300 having a single filter screen 324 (e.g., a single-sided coalescing device), similar to coalescing device 300 of FIG. 3B. As should be apparent, one difference between an example with two filter screens 324 and an example with a single filter screen 324 may be that external chamber 314 may substantially surround froth receiving chamber 302 for a two filter screen implementation. An external chamber 314 that surrounds froth receiving chamber 302 may be desirable, such as to provide additional surface area to coalesce any leakage froth, by way of example. It is noted that in one example, froth receiving chamber 302 may act as a channel (see, e.g., FIGS. 3D and 3E) bounded by one or more filter screens 324 (e.g., two facing filter screens 324, such as shown in FIG. 3D).

Figures 3F, 3G:
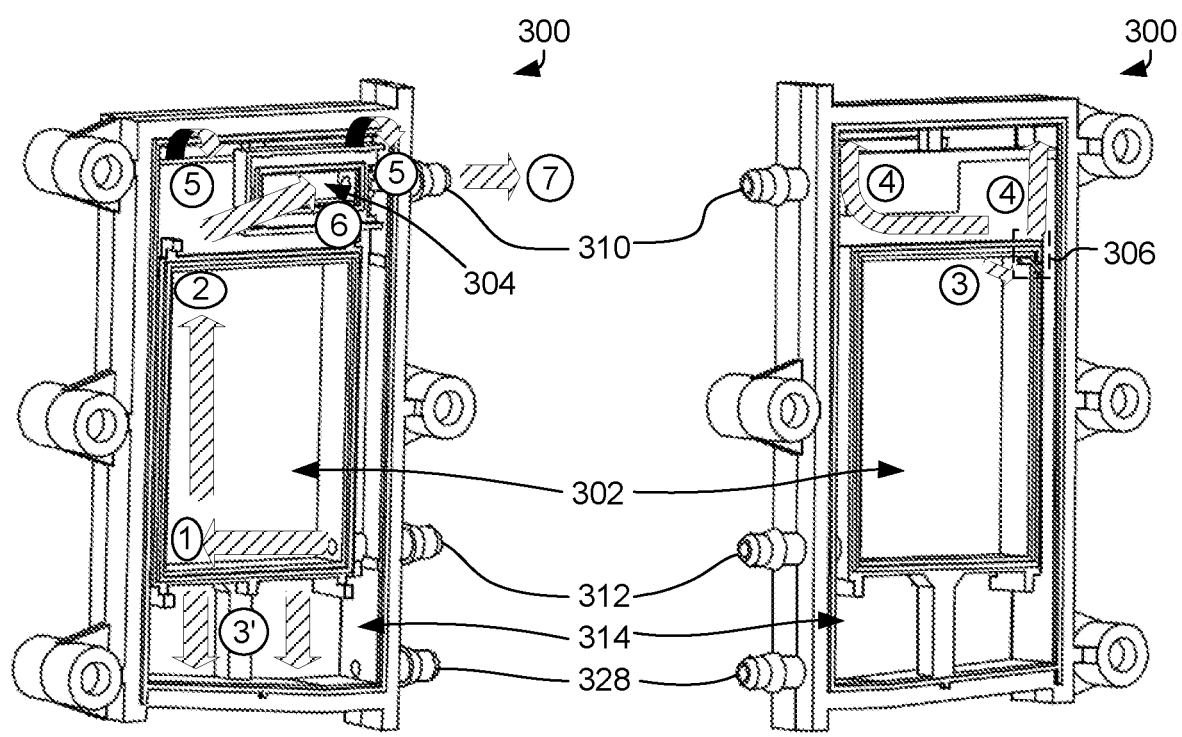
FIGS. 3F and 3G are front and back views of the example froth coalescing device from FIG. 3C.

Turning to FIG. 3C, an example coalescing device 300 is shown from a front view without filter screens 324, membrane 326, or covers 322 to illustrate an example arrangement of froth receiving chamber 302, gas out chamber 304, and external chamber 314. An external frame 320 of an example coalescing device 300 may be substantially polygonal in shape comprising two substantially parallel side frame members (e.g., having mounting fixtures 334) intersected by two substantially parallel top and bottom cross members. As should be apparent, external chamber 314 may comprise a lower area 354 into which coalesced liquids may pool. In fact, in one example, a lower frame member 356 of external frame 320 may be angled at a non-right angle with respect to the side frame members, such as to facilitate liquid pooling in proximity to liquid out port 328. An upper portion of external chamber 314 may be separated from a lower portion by channels along a perimeter of froth receiving chamber 302. Also, in one example (e.g., a coalescing device with two filter screens 324), external chamber 314 may be divided into front and rear portions (e.g., a front portion 360 and a rear portion 358, shown in FIG. 3D), such as by chamber dividing member 350 (shown in FIG. 3C with a dotted pattern fill). For instance, chamber dividing member 350 may separate a front portion 360 from a rear portion 358 of external chamber 314 and may comprise an upper window 352 usable to provide access between front and rear portions (360 and 358, respectively) of external chamber 314. Gas may have a tendency to rise to the upper portion of external chamber 314, such as towards gas out port 310, and gas out chamber 304. Thus, in one example, released gas may vent out of froth receiving chamber 302 on a back portion 358 of external chamber 314 (e.g., see FIG. 3G) and travel upwards towards window 352 through which access may be granted to a front portion 360 of external chamber 314, such as where gas out chamber 304 may be arranged. It may be that in some cases gas out port 310 may be arranged horizontally, such as shown in FIGS. 3A and 3B.

As noted above, in a single-sided coalescing device implementation, such as illustrated in FIGS. 3B and 3E, the approach of using a single filter screen may be desirable, such as for reduced cost. In one example, external chamber 314 may not be divided into front and rear portions, such as for a single filter screen coalescing device 300 (referred to alternatively as single-sided coalescing device 300) in FIG. 3B. Of course, this is not to be understood in a limiting sense and implementations in which a single-sided coalescing device 300 nevertheless has an external chamber 314 having front and rear portions are contemplated by the present disclosure.

Liquid coalescing may be facilitated through the use of filter screens 324. Filter screens 324 may comprise metal or plastic, by way of non-limiting example. Filter screens 324 may comprise pores through which coalesced liquids can travel, but through which froth bubbles may not be able to travel (e.g., as shown by the dotted pattern fill in FIGS. 3A and 3B). The porous surface of filter screens 324 may be abrasive and may thus cause froth bubbles to burst as the froth bubbles contact filter screens 324. Filter screens 324 may be attached, such as by a heat staking process, to froth receiving chamber frame 316 to form an enclosed froth receiving chamber 302. Filter screens 324 may be arranged such that a substantial portion of an inner surface area of froth receiving chamber 302 comprises an abrading surface, such as a surface of filter screens 324. For instance, in the two-sided coalescing device 300 implementation of FIG. 3A, the majority of surface area of froth receiving chamber 302 comprises an abrading surface of filter screens 324. And in the single-sided coalescing device 300 implementation of FIG. 3B, nearly half of the surface area of froth receiving chamber 302 may comprise an abrading surface of filter screen 324 (where the other facing surface is formed with a cover 322). The size, shape, and distribution of pores in filter screens 324 may be selected based on a variety of factors such as the type of liquid and expected flow rate of the froth, for example. Similar factors may be used to select a size and shape of froth receiving chamber 302. For example, a larger and taller froth receiving chamber 302 may be desirable for a froth having a higher flow rate, by way of illustration but not limitation.

At times, froth bubbles may leak out of froth receiving chamber 302. Membrane 326 may allow released gas to traverse into gas out chamber 304 while keeping any froth leakage in external chamber 314 (e.g., where it can coalesce, for example). Membrane 326 may comprise a number of possible materials capable of allowing gas to traverse the membrane while stopping liquids. Materials of membrane 326 may be selected based on the properties of the liquid to be coalesced, for example. For example, in one case, membrane 326 may comprise an oleophobic material, such as a material that uses expanded polytetrafluoroethylene (ePTFE) and is fabricated by W.L. Gore & Associates, Inc. (555 Paper Mill Road, Newark, Del. 19711), by way of non-limiting example. Membrane 326 may be attached to gas out chamber frame 318 in a similar orientation as filter screens 324 may be attached to froth receiving chamber frame 316. In one case, for example, filter screens 324 may be arranged to be substantially vertically oriented such that as froth bubbles travel vertically within froth receiving chamber 302, the froth bubbles abrade against filter screens 324. And in this example, membrane 326 may also be arranged in a similar substantially vertical orientation. As should be appreciated, arranging screens and membranes in a similar orientation may render device fabrication less cumbersome, such as by limiting a number of directions in which membranes (e.g., membrane 326), filter screens (e.g., filter screens 324), and covers (e.g., covers 322) may need to be attached to a frame.

External chamber 314 may be defined, in part, by covers 322. Covers 322 may comprise a number of possible materials, such as metal or plastic film, by way of non-limiting example, to prevent liquids and gasses from passing therethrough. As noted, covers 322 may be attached to external chamber frame 320 in substantially a similar orientation as filter screens 324 and membrane 326, for example.

In one example, mounting fixtures 334 may be arranged on the frame of coalescing device 300, such as to enable stacking of multiple coalescing devices 300. For example, in an implementation for coalescing printing fluids, a separate coalescing device 300 may be used for each color printing fluid (e.g., one for black, cyan, magenta, yellow, etc.). Coalescing devices 300 may be stacked using mounting fixtures 334, such as to preserve space, by way of example.

Coalescing devices 300 may be in fluid communication with different parts of a printer, such as a reservoir and a print head, by way of example. A number of ports may be arranged in the frame of coalescing device 300 to enable reception and transmission of fluids. For example, in one implementation, a froth input port 312 may be arranged to be coupled to a conduit from a print head, for example, and may enter froth receiving chamber 302. A liquid out port 328 may be arranged at a lower portion 354 of external chamber 314 to receive coalesced liquids that may pool in external chamber 314. Liquid out port 328 may be in fluid communication with a reservoir, such as a printing fluid reservoir, to receive and store coalesced liquids. A gas out port 310 may be arranged to be in fluid communication with gas out chamber 304. Gas out port 310 may vent gas via a conduit to a venting portion of a printer, for example.

To illustrate sample operation of liquid coalescing device 300, arrows illustrating fluid flow are included in FIGS. 3F and 3G, illustrating a two-sided example coalescing device 300 without filter screens 324, membrane 326, and covers 322. It is to be understood that while there may be differences between the structure of a two-sided example coalescing device 300 and a single-sided example coalescing device 300, those differences may not significantly alter the operation of coalescing device 300 and will be noted in the following explanation.

In one example, as shown using arrow 1, froth may be input to froth receiving chamber 302 via froth input port 312. An inlet of froth input port 312 may be arranged in a lower portion of froth receiving chamber 302. As froth enters froth receiving chamber 302, it may traverse a bottom portion of froth receiving chamber 302 until it meets an obstruction (e.g., such as a frame side member, other froth bubbles, etc.). Froth bubbles may then begin to be pushed upwards, as indicated by arrow 2. As froth bubbles travel within froth receiving chamber 302, the bubble surface may contact filter screens 324 (not shown in FIGS. 3F and 3G). Contact between froth bubbles and filter screens 324 may cause abrasion and breaking of froth bubbles. Additionally, gravity may also cause froth bubbles to break. As bubbles break, gas (e.g., air) may be released and continue to travel upward, such as in the direction of arrow 2 in FIG. 3F. Coalesced liquid may travel downwards in an opposite direction to arrow 2.

FIG. 3G shows a back side of an example two-sided froth coalescing device 300 in which a downward facing vent 306 is arranged in the frame of froth receiving chamber 302. Of note, in one example, downward facing vent 306 may be arranged in an opposite corner of froth receiving chamber 302 from an inlet to froth input port 312. It may be, for instance, that such an arrangement might provide additional surface area for abrasion against filter screens 324. Gas released as froth bubbles burst may travel through downward facing vent 306. At times, such as if froth receiving chamber 302 is full of froth bubbles, some froth may leak out of froth receiving chamber 302 through downward facing vent 306. In one example, froth that leaks out of froth receiving chamber 302 may coalesce at some point on a path between downward facing vent 306 and gas out port 310 or downward facing vent 306 and liquid out port 328.

However, in at least some cases, the received froth may coalesce within froth receiving chamber 302. Coalesced liquids may travel through pores in filter screens 324 and may travel in a direction indicated by arrows 3' (in FIG. 3F) to pool in a bottom portion of external chamber 314 (e.g., bottom portion 354 in FIG. 3C). In one example, as noted above, external chamber 314 may be arranged to enable liquid pooling in proximity to liquid out port 328. For instance, as illustrated, a side of external chamber 314 closest to liquid out port 328 may be lower than a facing side of external chamber 314. Such an arrangement may encourage pooling near liquid out port 328 and may facilitate liquid output, for example.

Returning to the released gas, upon exiting downward facing vent 306, the gas may travel upwards towards an upper portion of external chamber 314. In one case, it may be desirable to have released gas take a circuitous route that may encourage further froth bubble breakage of leaked froth. As indicated in FIG. 3G by arrows 4, released gas may travel in a number of different possible directions, such as about a back portion of gas out chamber 304. By way of example, referring to FIG. 3G, gas may travel across the back portion of gas out chamber 304 and then in an upwards direction, as indicated by the left arrow 4. Other portions of gas may travel directly upwards, as indicated by the right arrow 4. The released gas may travel towards an upper opening in external chamber 314 (e.g., upper window 352 in FIG. 3C).

In one example, released gas may travel over an upper opening in external chamber 314 (e.g., upper window 352 in FIG. 3C), such as shown by the left and right bent arrow 5 in FIG. 3F. Thus, the released gas may travel in a first direction (e.g., as indicated by the upward direction of left and right arrows 4, travelling towards the upper opening in external chamber 314) followed by a second direction substantially opposite to the first direction (e.g., as indicated by left and right bent arrows 5, which are to indicate a change from the upward direction of arrows 4 into a downward direction). Again, it may be that by having leaked froth change directions and travel a circuitous route, remaining bubbles may break. In one example, gas out chamber 304 may comprise an entrance via a membrane (e.g., membrane 326), on one side of external chamber 314. As shown by arrow 6, gas may travel from external chamber 314 to gas out chamber 304 through a membrane 326 (not shown in FIG. 3F). Gas in gas out chamber 304 may be vented out via gas out port 310, as illustrated by arrow 7 in FIG. 3F.

In an example coalescing device (e.g., one-sided example coalescing device 300 in FIG. 3B), external chamber 314 may not be divided into front and rear portions, such as front 360 and rear 358 portions in FIG. 3D. Rather, as shown in FIG. 3E, external chamber 314 may be arranged to enclose a single side of froth receiving chamber 302. As such, the foregoing description of traversing an upper window may not be applicable in some contexts. Instead, released gas may travel from a downward facing vent 306 to gas out chamber 304.

As discussed above, methods and devices for coalescing fluid from a froth may comprise a froth receiving chamber having vent arranged to vent gas in a direction different from a direction of travel of froth within the froth receiving chamber. A vertically-oriented membrane may be arranged between the froth receiving chamber vent and a gas out port. In one example, the membrane may be permeable as to gas but not as to liquids.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A froth coalescing device comprising:
   a froth receiving chamber with a vent arranged to vent gas and coalesced liquid, wherein the gas is released in a direction different from a direction of travel of froth in the froth receiving chamber and the coalesced liquid;
   a vertical membrane arranged between the vent of the froth receiving chamber and a gas out port of the froth coalescing device; and
   an external chamber in fluid communication with the froth receiving chamber via the vent of the froth receiving chamber, wherein the external chamber is arranged such that released gas is to travel in a first direction followed by a second direction, the first and second directions being substantially opposite.

2. The froth coalescing device of claim 1, further comprising a filter screen arranged between the froth receiving chamber and the external chamber to allow the coalesced liquid from the froth receiving chamber to traverse pores of the filter screen to the external chamber.

3. The froth coalescing device of claim 1, further comprising a pair of facing filter screens arranged on opposite sides of a frame of the froth receiving chamber.

4. The froth coalescing device of claim 1, further comprising a frame comprising mounting fixtures to enable stacking of froth coalescing devices.

5. The froth coalescing device of claim 4, wherein the frame comprises a froth input port to the froth receiving chamber and a coalesced liquid out port from an external chamber external to the froth receiving chamber.

6. The froth coalescing device of claim 5, wherein the gas out port comprises a horizontally arranged gas out port.

7. The froth coalescing device of claim 4, further comprising covers mounted on the frame to form an external chamber about the froth receiving chamber.

8. A method of coalescing a liquid from froth, the method comprising:
  receiving froth from a froth input port;
  forcing bubbles of the froth through a channel comprising a first vertically-oriented abrading screen such that released gas exits the channel through a downward facing vent of a frame of the channel and coalesced liquid drains through pores of the vertically-oriented abrading screen and out through a liquid out port; and
  forcing the bubbles of the froth against a second vertically-oriented abrading screen arranged on the channel to face the first vertically-oriented abrading screen.

9. The method of claim 8, further comprising forcing the released gas through a vertically-oriented membrane arranged between the downward facing vent of the frame of the channel and a gas out port.

10. The method of claim 9, further comprising forcing the released gas in a first upward direction upon exiting the downward facing vent and subsequently forcing the released gas in a downward direction towards the vertically-oriented membrane.

11. The method of claim 8, wherein the coalesced liquid comprises printing fluid.

12. A froth coalescing device comprising:
  a polygonal outer frame with two approximately parallel side members and substantially parallel top and bottom members, the outer frame having a liquid out port;
  a first inner frame defining a froth receiving chamber, the froth receiving chamber in fluid communication with a froth input port of the polygonal outer frame and comprising a downward facing vent to release gas and coalesced liquids in a first direction;
  a second inner frame defining a gas out chamber in fluid communication with a gas out port and the downward facing vent, wherein the gas is to travel in a second direction towards the second inner frame after being released from the downward facing vent in the first direction;
  a vertically-oriented filter screen attached to the first inner frame and comprising pores traversable by coalesced liquids;
  a vertically-oriented membrane attached to the second inner frame of the frame; and
  outer covers attached to the polygonal outer frame.

* * * * *